Sept. 22, 1942.                F. C. TANNER                2,296,749
                                  GAUGE
                            Filed Nov. 22, 1940          2 Sheets-Sheet 1
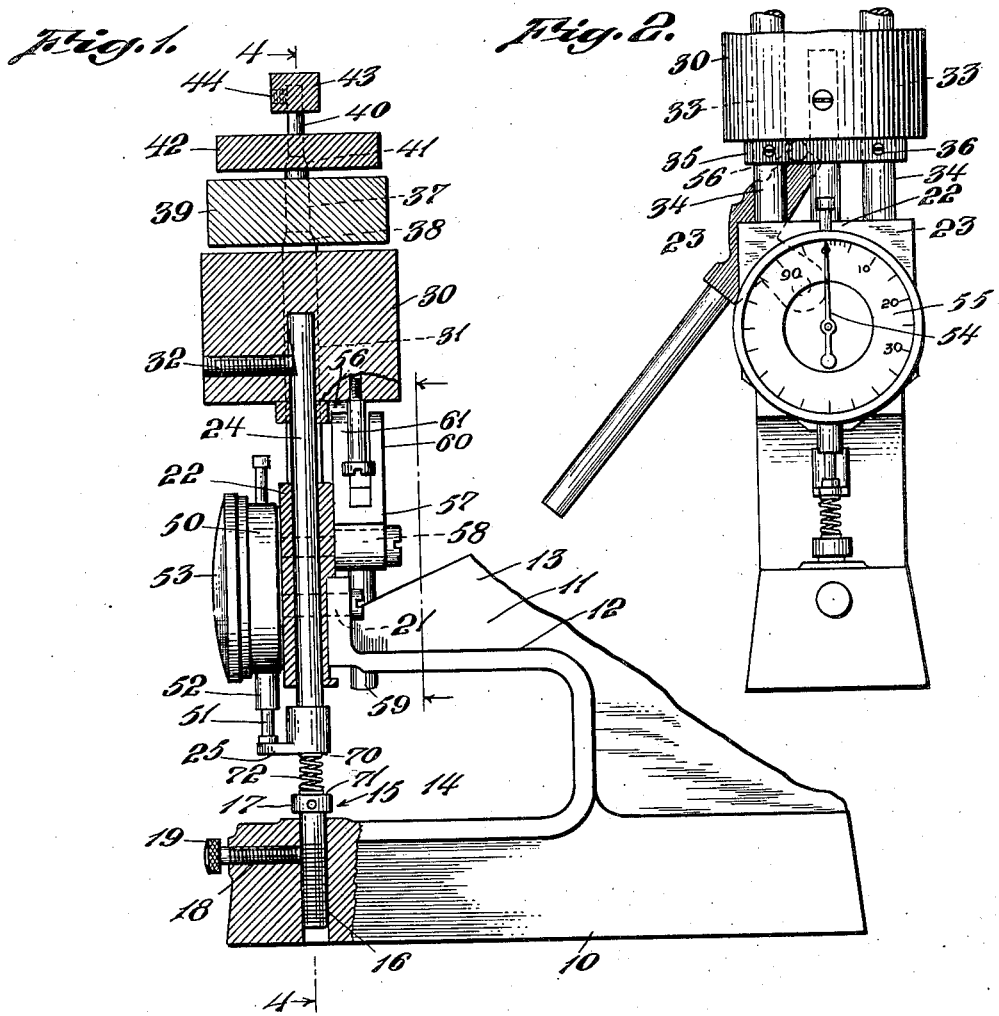
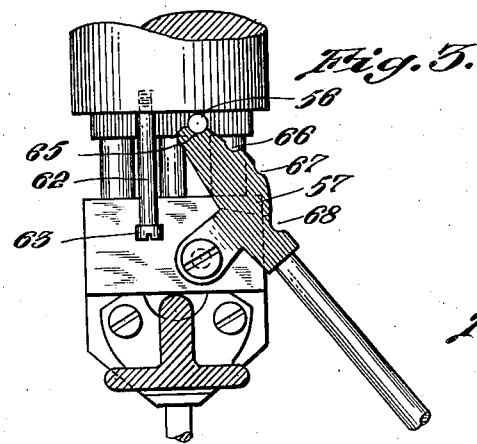
INVENTOR.
Frederick C. Tanner
BY Barlow & Barlow
ATTORNEYS.

Sept. 22, 1942.                F. C. TANNER                2,296,749
                                  GAUGE
                           Filed Nov. 22, 1940            2 Sheets-Sheet 2
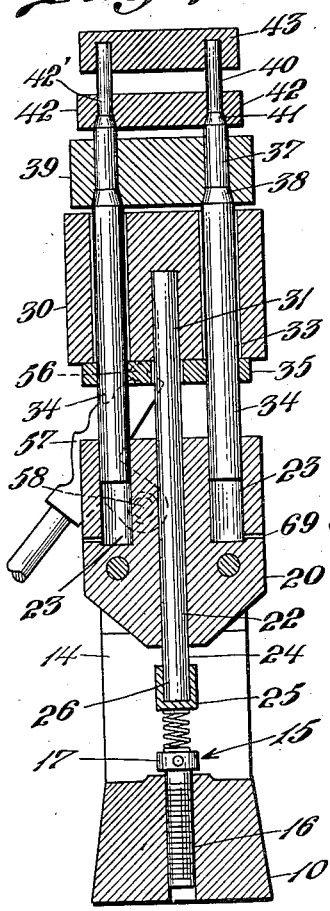
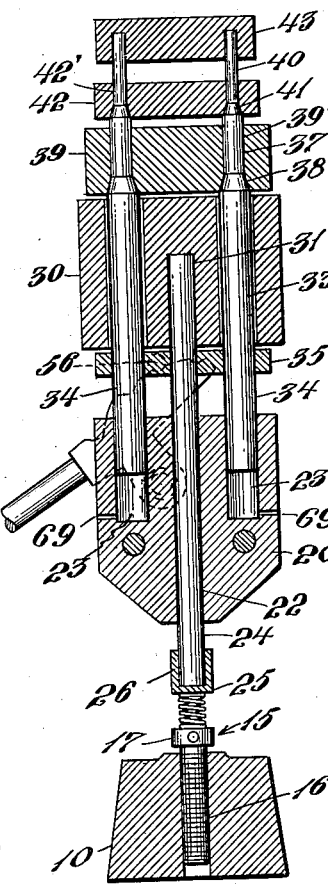
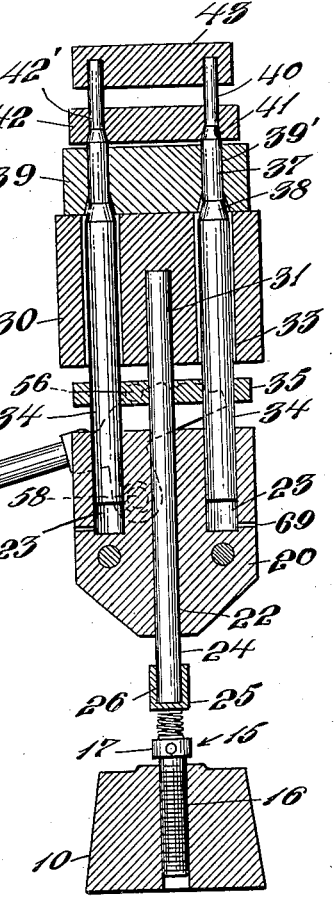
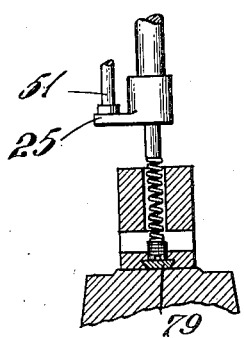
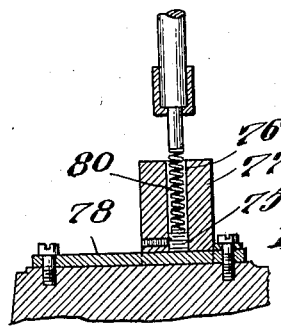
INVENTOR.
Frederick C. Tanner
BY Barlow & Barlow
ATTORNEYS.

Patented Sept. 22, 1942

2,296,749

UNITED STATES PATENT OFFICE 2,296,749

GAUGE

Frederick C. Tanner, Warwick, R. I., assignor to Federal Products Corporation, a corporation of Rhode Island Application November 22, 1940, Serial No. 366,541

12 Claims. (Cl. 33—147)

This invention relates to an apparatus for the testing of parts of mechanical assemblies and is particularly adapted for testing helical springs.

One of the objects of this invention is to provide a device in which several different tests may be made without adding any parts to the device and by simply manipulating an operating handle.

Another object of the invention is to provide an arrangement whereby a plurality of different weights may be applied to the test that the effect of different gravitational masses upon the article to be tested may be observed.

Another object of the invention is to provide an entirely mechanical device for performing the test so that tests made by several of these devices even though made by different operators will provide uniform results free from the variations which may occur through human error.

A more specific object of the invention is to provide a plurality of weights which may be successively added to the test in a device for holding all of the weights free from the work for an overall dimension test of the work by the insertion of the work to be tested in the device.

With these and other objects in view, the invention consists of certain novel features of construction, as will be more fully described, and particularly pointed out in the appended claims.

In the accompanying drawings:

Fig. 1 is a fragmental side elevation, partly in section, of the device;

Fig. 2 is a face view of the device with the upper part broken away;

Fig. 3 is a fragmental view, partly in section, illustrating the lifting cam;

Figs. 4, 5 and 6 are sectional views taken on substantially line 4—4 of Fig. 1 showing various positions of the moving parts of the device;

Fig. 7 is a fragmental sectional view of a modified form of lower anvil; and

Fig. 8 is a view similar to Fig. 7 on a section taken substantially at right angles to the section of Fig. 7.

In a gauge of the type to which this invention more particularly appertains, the prior art structures provide no means for gauging the overall length of the work to be tested and where different amounts of weight are to be utilized, separate units are manually assembled individually onto the device; and in order to provide additional tests which are desirable and to arrange that the weights may be added in a predetermined mechanical manner I have provided a plurality of weights in the device and arranged mechanical mechanism so that they may be successively added in a predetermined manner by simple mechanical manipulation with an operating handle, while at the same time the work-engaging anvils may be spaced apart a predetermined distance for the effecting of an overall dimension test of the work; and the following is a more detailed description of the present embodiment of this invention, illustrating the preferred means by which these advantageous results may be accomplished:

With reference to the drawings, 10 designates the base of the device which is usually of cast construction providing a sufficient mass at the lower portion of the device for maintaining itself upon a bench unaffected by small vibrations. This base casting has an overarm 11 extending therefrom which is of generally T-shape construction consisting of the flanges 12 and rib 13. The overarm provides a throat portion 14 in which the test to be performed is conveniently located. In the solid portion of the base a lower anvil 15 is located which is threaded into the base as at 16 and may be adjusted as to height by the turning of its head 17. When the adjustment is performed, a set screw 18 extending through the base engages the anvil and holds the same in vertical adjustment. The head 19 is knurled for the convenient grip for turning.

Upon the overarm 11 a mounting block 20 is secured by means of bolts 21, and this block in turn carries all the moving parts of the apparatus. The block is provided with three parallel bores, the central bore being designated 23 and extending but partially through the block. In the central bore there is slidably positioned a plunger rod 24 which has a foot 25 with a socket 26 to receive the rod 24 and is held on the lower end of this rod by a set screw. The foot 25 provides the upper anvil to engage the work and also a rest for the feeler of the indicator which follows the foot as the same moves toward and from the lower anvil.

The upper end of the plunger rod 24 extends into a weight 30 which is provided with a bore 31 extending partly thereinto in which the rod 24 bottoms. This rod is notched to receive a set screw 32 extending through the weight to lock the same in position on the rod. The weight 30 is also provided with parallel openings 33. Guide pins 34 extend into the parallel bores 23 and through the openings 33 in the weight 30. A yoke 35 embraces the two pins 34 and is secured pins 34 by the screws 36. This yoke engages the underside of the weight 30 so as to prevent the weight 30 from descending except that it follows the yoke 35 or is held up through the upper anvil as by the work. The pins 34 freely slide through the weight 30 and extend upwardly where they are reduced in diameter as at 37 providing the tapered shoulder 38 and upon this portion 37 of the pins there is another weight 39 secured which is provided with parallel bores 39' of a size to slidably receive the reduced portion 37 of the pins 34. These bores are tapered at their lower end so as to fit the tapered portion 38 of the pins 34. Thus, as the guide pins 34 are moved upwardly, the taper 38 will pick up the weight 39 when the guide pins have been moved to a predetermined height. However, after the guide pins are lowered, the weight 39 will rest upon and effectively add its weight to the weight 30.

At a further point upwardly of the pins 34 they are reduced again as at 40 to provide a tapered portion 41 and on this reduced portion 40 there is another weight 42 having parallel bores 42' to receive the reduced portion 40 which bores are tapered at their lower end to fit the taper 41 of the rods. The operation with respect to the weight 42 will be the same as that with respect to the weight 39; that is, raising of the guide pins will pick up the weight 42. A cap 43 receives the upper end portions 40 of the guide rods and is held in position by set screws 44. The spacing of the shoulders 38 and 41 is such that raising of the guide pins first pick up weight 42 and then by further movement will pick up weight 37 to successively lift each from its action on the plunger rod 24.

A dial gauge 50 is secured to the face of the mounting block 20 and has its feeler 51 extending through the dial gauge and urged by a spring downwardly through the stem 52 so as to rest upon the foot 25. The face of the dial 55 is visible through the crystal 53 for observation of the indicating hand 54.

In order that the device may be mechanically operated, I have provided a cam following pin 56 extending rearwardly from the yoke 35, and I have mounted a cam 57 on a pivot pin 58 secured on the block 20 and shouldered to limit the amount that it will be threaded inwardly. An operating handle 59 extends from this cam. The cam surface is slotted to provide bifurcated portions 60 and 61 to straddle a pin 62 fastened to weight 30 so that as the handle is moved upwardly, the head 63 of the pin will engage the cam and the work will be drawn down. When the handle 59 is at its extreme lower position, notch 65 of the cam will engage the pin 56 and the foot will be raised so that its upper anvil surface 70 will be a fixed distance from the lower anvil surface 71 and provide an overall length gauge for the work as shown in Fig. 4. When the handle is moved to its first step where it will be caught by a notch 66 in the cam surface, as shown in Fig. 5, the first weight 30 will be permitted to exert its force upon a spring or other piece of work 72 to be tested. However, the cam will in this position support the weights 39 and 42 through the guide pins so that their influence is not felt. Further swinging of the handle to another notch 67 will lower the guide pins 34 so that the weight 39 will add its mass to the weight 30, although the weight 42 will be supported as shown in Fig. 6, whereas in the next notch the weight 42 will be added by reason of the further lowering of the guide pins 34; and in the next notch 68 all the weights will be added and by swinging upwardly of the handle the head 63 of the pin 62 extending from the lower weight will be engaged by the undersurface of the bifurcated cam and the entire weights may be drawn downwardly so as to extrude any air through bleed openings 69 which possibly may be trapped in the guide bores of the mounting block.

The feeler 51 of the dial gauge which rests upon the foot 25 will follow the upper anvil downwardly so that indication through the hand 54 will occur for determining the amount of compression of the spring 72 at each of the various stages of application of additional weight.

In some cases a spring of rather extended length is to be tested, and in such cases a lower anvil 75 is provided at the bottom of a guide bore 76 in the block 77. This block is mounted upon a slide carriage 78 having a dovetail connection with the track 79 on the base, the arrangement being such that the carriage may be pulled outwardly from beneath the super structure for the loading of the spring in position and then slid below the upper anvil for performing the test; and as compression occurs, the spring designated 80 will be guided in its movement and not flexed laterally between the anvils during the test.

I claim:

1. A thickness gauge comprising a lower anvil, a plunger rod provided at its end with an upper anvil and movable toward and from said lower anvil, a weight carried by said rod, a support movable into or out of engagement with said weight to move the same relative to the lower anvil, and cam means engaging said support and operable to position said support into or out of engagement with said weight to control the movement of said rod.

2. A thickness gauge comprising a lower anvil, a plunger rod provided at its end with an upper anvil and movable toward and from said lower anvil, a weight carried by said rod, a support movable into or out of engagement with said weight to move the same relative to the lower anvil, manually operable means for mechanically moving said support into engagement with said weight for lifting the same and holding said rod in elevated position or releasing said weight for movement downwardly by gravity, and guide pins secured to said gauge and operatively engageable by said weight to assist in directing movement of said weight.

3. A thickness gauge comprising a lower anvil, a mounting block, a plunger rod vertically slidable in and guided by said block and provided at its end with an upper anvil, a weight secured to said rod, guide pins slidable in and guided by said block in paths parallel to the path of movement of said plunger rod, a cam follower secured to said pins and movable relative to said plunger rod to engage the weight carried by the rod and lift the rod, and a cam to actuate said cam follower.

4. A thickness gauge comprising a lower anvil, a mounting block, a plunger rod vertically slidable in and guided by said block and provided at its end with an upper anvil, a main weight secured to said rod, guide pins slidable in and guided by said block in paths parallel to the path of movement of said plunger rod and also freely slidable through said weight, and a second weight above said main weight engageable by said guide pins, a cam follower secured to said pins and movable relative to said plunger rod to engage the weight carried by the rod and lift the weight and rod, and a cam to actuate said cam follower to selectively lift the second weight above the main weight and the main weight to a predetermined height or lower the follower an amount to permit the main weight alone to act or a further amount to lower the second weight into engagement with the main weight and cause both weights to act through the plunger rod.

5. A thickness gauge comprising a lower anvil, a mounting block, a plunger rod vertically slidable in and guided by said block and provided at its end with an upper anvil, a main weight secured to said rod, guide pins slidable in and guided by said block in paths parallel to the path of movement of said plunger rod and also freely slidable through said weight, and a second weight above said main weight engageable by said guide pins, a cam follower secured to said pins and movable relative to said plunger rod to engage the weight carried by the rod and lift the rod, and a cam having a plurality of steps therein to actuate said cam follower to selectively lift the second weight above the main weight and the main weight to a predetermined height or lower the follower one step to permit the main weight to act or a second step to lower the second weight into engagement with the main weight and cause both weights to act through the plunger rod.

6. A thickness gauge comprising a lower anvil, a plunger rod provided at one of its ends with an upper anvil and movable towards and from said lower anvil, a weight carried by said rod, a support movable into or out of engagement with said weight to move the same relative to the lower anvil and manually operable means separate of said support and movable into engagement therewith for moving said support into engagement with said weight for lifting and holding the same in elevated position or releasing the same for movement downwardly by gravity.

7. A thickness gauge comprising a lower anvil, a plunger rod provided at one of its ends with an upper anvil and movable towards and from said lower anvil, a weight carried by said rod, a support movable into or out of engagement with said weight to move the same relative to the lower anvil and manually operable means including a cam movable into engagement with said support for moving the same into engagement with said weight for lifting and holding the same in elevated position or releasing the same for movement downwardly by gravity.

8. In a gauge, a plunger having an anvil thereon, a carriage, a second anvil mounted on said carriage, and means for movably mounting the carriage for displacement from beneath the plunger for loading of the work, said carriage having a bore therein opening onto said second anvil, of a size to freely receive the work to be tested and with the axis of said opening extending parallel with the axis of said plunger.

9. A thickness gauge comprising a frame, a lower anvil thereon, a plunger rod provided with an upper anvil at its end and movable toward and from the lower anvil, a support mounted for movement axially of said plunger rod, a plurality of weights carried by said support in spaced relation with each other, a handle movably secured to said frame and having a portion thereof movable into engagement with said support for moving the same for successively adding said weights to the rod to increase the gravitational force.

10. A thickness gauge comprising a frame, a lower anvil thereon, a plunger rod provided with an upper anvil at its end and movable toward and from the lower anvil, a support mounted for movement axially of said plunger rod, a plurality of weights carried by said support in spaced relation with each other, a handle movably secured to said frame and having a cam portion thereon movable into engagement with said support and operable for moving said support for successively adding said weights to said rod to increase its gravitational force.

11. A thickness gauge comprising a frame, a lower anvil thereon, a plunger rod provided with an upper anvil at its end and movable toward and from the lower anvil, a plurality of weights positioned at a location directly above said rod, a support movable relative to said frame and extending into engagement with said weights and having means thereon for supporting said weights in spaced relation with each other and out of engagement with said rod and movable to successively release and add each of said weights to said rod to step by step increase its gravitational force.

12. A thickness gauge comprising a frame, a lower anvil thereon, a plunger rod provided with an upper anvil at its end and movable toward and from the lower anvil, a support mounted for movement axially of said plunger rod, a weight carried by said support, a handle movably secured to said frame and having a portion thereof movable into engagement with said support for moving the same for adding said weight to the rod to increase its gravitational force.

FREDERICK C. TANNER.